US United States Patent Office 3,481,756
Patented Dec. 2, 1969

3,481,756
METHOD OF COATING WITH AN OXYMETHYLENE POLYMER
Arthur Kong, Kearney, N.J., assignor to Celanese Corporation, a corporation of Delaware
No Drawing. Filed Mar. 2, 1965, Ser. No. 436,665
Int. Cl. B44d *1/09, 1/14*
U.S. Cl. 117—21                              6 Claims

ABSTRACT OF THE DISCLOSURE

Solutions of polyvinyl acetals have been found to be effective primers for coating an oxymethylene polymer onto numerous bases, such as metals or glass. Very effective results are obtained with solutions of polyvinyl formal or polyvinyl butyral. The oxymethylene polymer coating can then be applied by immersing primed part in a fluidized bed of the polymer.

---

The present invention relates broadly to the coating art, and is more particularly concerned with a novel method of coating articles with oxymethylene polymer compositions.

When an object made of either a metallic or non-metallic material is coated directly with an oxymethylene polymer of powder spraying or by a process known as fluidized bed coating, it has been found, on many occasions, that it is difficult to get adequate adherence between the polymer coating and the object which is being coated. Importantly, in the subject invention it has been found that if the object to be coated is pretreated with a suitable base or primer materials, there is provided a surface highly receptive to the polymers, and as a result a tightly adherent film or coating of oxymethylene polymer may be obtained thereon by the use of fluidized bed or powder spraying or related techniques.

Oxymethylene polymers, having recurring —OCH$_2$— units directly attached to each other, have long been known. Such polymers may be prepared by the polymerization of formaldehyde or trioxane, which is a cyclic trimer of formaldehyde. High molecular weight oxymethylene polymers vary in thermal stability and, in accordance with a preferred embodiment of this invention, the polymer which is stabilized is an oxymethylene polymer containing carbon-to-carbon single bonds in the main polymer chain.

In a particularly preferred embodiment of our invention, the polymeric compounds to be treated are oxymethylene copolymers having at least one chain containing recurring oxymethylene units interspersed with —OR— groups in the main polymer chain, where R is a divalent radical containing at least two carbon atoms directly linked to each other and positioned in the polymer chain between the two valences, with any substituents on said R. radical being inert, that is those which are free of interfering functional groups and which will not induce undesirable reactions. Particularly preferred are copolymers which contain from 60 to 99.6 mol percent of recurring oxymethylene groups. In a preferred embodiment R may be, for example, an alkylene or substituted alkylene group containing at least two carbon atoms.

Among the copolymers which may be utilized in accordance with this aspect of the invention are those having a structure comprising recurring units having the formula

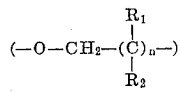

wherein *n* is an integer from zero to 5 and wherein *n* is zero in from 60 to 99.6 percent of the recurring units. R$_1$ and R$_2$ are inert substituents, that is, substituents which are free of interfering functional groups and will not induce undesirable reactions.

A preferred class of copolymers are those having a structure comprising oxymethylene and oxymethylene recurring units wherein from 60 to 99.6 percent of the recurring units are oxymethylene units.

Particularly preferred oxymethylene polymers are those having incorporated therein oxyalkylene units having adjacent carbon atoms which are derived from cyclic ethers having adjacent carbon atoms. These copolymers may be prepared by copolymerizing triozane or formaldehyde with a cyclic ether having the structure

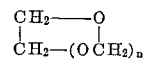

wherein *n* is an integer from zero to 2.

Examples of preferred polymers include copolymers of trioxane and cyclic ethers containing at least two adjacent carbon atoms such as the copolymers disclosed in U.S. Patent No. 3,027,352 to Walling et al., which patent is assigned to the same assignee as the subject application.

Among the specific cyclic ethers which may be used are ethylene oxide; 1,3-dioxolane; 1,3,5-trioxepane; 1,4-dioxane; trimethylene oxide; pentamethylene oxide; 1,2-propylene oxide; 1,2-butylene oxide; neopentyl formal; pentaerythritol diformal; paraldehyde; tetrahydrofuran and butadiene monoxide.

Other oxymethylene polymers and methods of preparation therefor are disclosed by Sittig in Hydrocarbon Processing and Petroleum Refiner, 41(11), pp. 131–170 (November 1962) and by Kern et al., in Angewandte Chemie 73(6) pp. 177–186 (Mar. 21, 1961), including polymers containing repeating carbon-to-carbon single bonds in the polymer chain by copolymerizing trioxane with cyclic ethers such as ioxane, lactones such as beta-propiolactone, anhydrides such as cyclic adipic anhydride, and ethylenically unsaturated compounds such as styrene, vinyl methyl ketone and acrolein.

As used in the specification and claims of the instant application, the term "oxymethylene" includes substituted oxymethylene, where the substituents are inert with respect to the reactions in question, that is, the substituents are free of interfering functional groups and will not introduce undesirable reactions.

As used in the specification and claims of this application, the term "copolymer" means polymers having two or more monomeric groups, including terpolymers and higher polymers. Suitable terpolymers include those disclosed in U.S. patent application Ser. No. 229,715, filed Oct. 10, 1962 and now abandoned in favor of Ser. No. 708,428, filed Feb. 26, 1968, in the names W. E. Heinz and F. B. McAndrew, which is also commonly assigned.

Oxymethylene polymers, suitable for use in this invention also include oxymethylene homopolymers, such as those made from trioxane or formaldehyde. In certain instances it may be desirable to "end-cap" the polymer molecules by such methods as esterification or etherification in order to increase their thermal stability.

The preferred polymers which are treated in accordance with this invention are thermoplastic materials having a melting point of at least 150° C. and are normally millable at a temperature of about 200° C. They have an average molecular weight of at least 1000. These polymers have a high thermal stability before the treatment disclosed herein, however, this stability is markedly improved by such treatment. For example, if a sample of the polymer which has been treated in accordance with this invention, and which has also been chemically stabilized as described below, is placed in an open vessel in a circulating air oven at a temperature of about 230° C., and its weight loss is measured without removal of the sample from the oven, it will have a thermal degradation rate of less than 1.0 wt. percent/min. for the first 45 minutes and, in preferred instances, less than 0.1 wt. percent/min. for the same period of time.

The preferred polymers which are treated in this invention have an inherent viscosity of at least one, when measured at 60° C. in an 0.1 weight percent solution in p-chlorophenol containing 2 weight percent of α-piene.

In a preferred embodiment of this invention it is generally desirable to incorporate one or more thermal stabilizers into the copolymer in order to bring its thermal degradation rate even lower. The proportion of stabilizer incorporated depends upon the specific stabilizer used. A proportion between about 0.05 and 10 weight percent, based on the weight of the polymer, has been found suitable for most stabilizers.

One suitable stabilizer system is a combination of (1) an antioxidant ingredient, such a phenolic antioxidant and most suitably a substituted bisphenol, and (2) an ingredient to inhibit chain scission, generally a compound or a polymer containing trivalent nitrogen atoms.

A suitable class of alkylene bisphenols includes compounds having from 1 to 4 carbon atoms in the alkylene group and having from zero to 2 alkyl substituents on each benzene ring, each alkyl substituent having from 1 to 4 carbon atoms. The preferred alkylene bisphenols are 2,2'-methylene bis-(4-methyl-6-tertiary butyl phenol) and 4,4'-butylidene bis-(6-tertiary butyl-3-methyl phenol). Suitable phenolic stabilizers other than alkylene bisphenols include 2,6-ditertiary butyl-4-methyl phenol, octyl phenol and p-phenyl phenol.

Suitable scission inhibitors include carboxylic polyamides, polyurethanes, substituted polyacrylamides, polyvinyl pyrrolidone, hydrazides, compounds having 1 to 6 amide groups, proteins, compounds having tertiary amine and terminal amide groups, compounds having amidine groups, cycloaliphatic amine compounds, and aliphatic acylurea.

The stabilizers may be incorporated into the polymer by dissolving both the polymer and the stabilizer in a common solvent and thereafter evaporating the solution to dryness. Alternatively, the stabilizers may be incorporated into the polymer by applying a solution of the stabilizer to finely divided polymer, as in a slurry, and thereafter filtering the polymer and evaporating to dryness. The stabilizer, when in finely divided dry state, may be blended into finely divided polymer in any suitable blending apparatus.

One suitable method of incorporation of the chemical stabilizers is by blending a dry solid stabilizer into the plastic polymer, while the latter is being kneaded on heated rolls or through an extruder.

In accordance with one embodiment of this invention, the part or article to be coated is maintained at an elevated temperature in a zone wherein finely divided particles of an oxymethylene polymer are maintained in a fluidized state with the zone-containing particles being known as a fluidized bed. A fluidized bed is a mass of solid particles which exhibits the liquid-like characteristics of mobility, hydrostatic pressure and an observable upper free surface or powdery zone across which a marked change in concentration of particles occurs. The fluidized bed may be termed "a dense phase" having an upper free surface. The fluidized bed technique is well known to those skilled in the art and is disclosed, for example, in U.S. Patent Nos. 2,974,060 and 3,032,816.

In general, the fluidized bed is formed by introducing an ascending current of gas into the particulate coating material under pressure with the bed being maintained in the fluidized state by controlling the flow of the gas. An article to be coated is immersed at least partially into the fluidized bed of the coating material. In order to provide adhesion the article to be coated is usually heated either before or during the immersion process. The polymer particles are suitably ground to a size between about 40 to 325 mesh (420 to 44 microns), and preferably between 80 and 200 mesh (177 to 74 microns). It has been found, however, that when an article has been coated with oxymethylene polymer by the use of a fluidized bed technique or by a powder spraying process that it is frequently difficult to obtain satisfactory adherence for certain uses. Therefore, in accordance with the subject invention, the article to be coated is precoated with a base or primer material which results in a surface suitable for adherent coating with an oxymethylene polymer.

A preferred precoating or priming material in accordance with the present inventive concepts is a polyvinyl acetal, and particularly satisfactory results are obtained when there is employed a solution of either polyvinyl formal or polyvinyl butyral. A preferred solvent system when the primer is polyvinyl formal is either methylene or ethylene chloride, however, suitable substitutes for either of the solvents are chloroform, furfural, methyl butynol, methyl pentynol, or a mixture of toluene and ethanol. The primer or precoating material may be dissolved in the solvent in an amount between about ½ to 5 percent by weight.

Should it be desired to substitute polyvinyl butyral for polyvinyl formal, a suitable solvent system therefor may include cyclohexanone, n-butanol, dioxane, a 95% solution of ethanol, an 85% solution of ethyl acetate, or a mixture of toluene and ethanol.

A wide variety of substrates may be primed prior to coating by either a fluidized bed technique or by a powder spraying process. More specifically, the substrate or base may be steel, aluminum, copper, chromate or zinc plated steel, glass and like materials. Prior to priming, however, the substrate is desirably cleansed to remove any deleterious substances thereon, and the specific cleansing procedure which is used will in measure of course depend upon the composition of the substrate. A vapor decreasing technique using a solvent such as trichloroethylene may in certain instances be employed, while if the base is steel, an oxide layer may be present thereon, and in this event, an effective cleansing agent is hydrochloric acid of about a 25 to 30% concentration.

After the substrate has been suitably cleansed, and if necessary subjected to a water rinse and air drying, it is then primed with one of the polyvinyl acetals mentioned. The priming solution, as was stated earlier, may be made up of from 1 to 5% of polyvinyl formal in either methylene or ethylene chloride, and the mode of application of the priming solution may be either sprayed, dipping or related techniques. Variations may of course be practiced in the thickness of the primer coating applied, and a suitable thickness range is between ¼ and 1½ mils. The primed base or article is then desirably dried to assure good adherence of the primer to the base, and an illustrative drying procedure is to place the primed part in an oven maintained at a temperature of approximately 475° F. Good results are obtained when the part is allowed to remain in the oven for approximately three minutes at the mentioned temperature, which results in the primer coating reaching a semi-molten or molten condition.

Immediately subsequent to the preheating step above described, the primed part is immersed in the fluidized bed of particulate oxymethylene polymer, or subjected to a spray coating of the particulate material. Oxymethylene coatings varying in thickness from about 1 to about 30 mils may be obtained during a single immersion. To improve the gloss and to reduce the porosity of the coating it may be desirable to reheat the article after coating to a temperature in the same range as the preheated temperature. This reheating insures that the surface particles are fused and permits the material to flow into an even coat. If desired, the article may then be reimmersed in the fluidized bed or otherwise again coated to build up the thickness of the coating. It has been found that repeated immersions may be used to increase the coating thickness to 200 mils or above. After sufficient thickness is obtained, the coated parts are post-heated for five to ten minues in an oven maintained at a temperature of about 475° F. This enhances the flowing of the oxymethylene polymeric particles, making certain that no surface blemishes or defects exist in the polymeric coating. The post-heated part may then be permitted to cool to room temperature, or if desired, it may be quenched in water to solidify the oxymethylene polymer coating.

As stated, numerous bases or substrates may be primed and coated in accordance with the novel aspects of this invention. The articles may be metallic and may include bases such as aluminum; aluminum alloys such as aluminum alloyed with 5 to 12% silicon, nickel, magnesium, tin, chromium, titanium; steel such as low and high carbon steels and other alloys with iron including chromium, molybdenum, silica, manganese and titanium; and other metallic materials such as brass, bronze, copper, zinc, magnesium and iron. In addition to metallic articles, other bases which may be satisfactorily coated include certain non-metallic materials such as glass, ceramic and plastic bases, such as thermosetting resins of phenolic urea and melamine type. However, all materials should be able to withstand the temperatures necessary in order to form satisfactory oxymethylene polymer coatings. Thus, the article to be coated must have a melting point above that of the polymer used in the coatings.

Unless stated otherwise in the following examples, oxymethylene polymers were used which were prepared by polymerizing trioxane and ethylene oxide, which polymers contain approximately 2 weight percent of randomly distributed oxyethylene groups in the oxyethylene chains. The polymers had been stabilized prior to molding by hydrolytic degradation of their unstable polymer ends and by the incorporation of approximately 0.1 weight percent of a suitable scission inhibitor such as cyanoguanidine, benzoguanidine, melamine or N,N'N''-tri-n-propyl-melamine, and 0.5% of a suitable phenolic stabilizer such as 2,2' methylene-bis (4-methyl-6-tertiary butyl phenol) or 2,2' methylene-bis (4-ethyl-6-tertiary butyl phenol).

EXAMPLE I

An article formed of plain steel and measuring 1/8 x 1 x 3 inches was cleaned by dipping in a hydrochloric acid solution of about 25 to 30% concentration. This effectively removed an oxide layer thereon, and the cleansed part was then rinsed with room temperature water, followed by drying with forced room temperature air. The dried part was mixed in a 1 to 5% solution of polyvinyl formal in methylene chloride, followed by heating for five minutes in an oven maintained at a temperature of about 475° F. A fluidized bed, having particles of approximately 80 mesh size, was prepared using air at room temperature as the gaseous medium. The precoated heated articles were immersed in the fluidized bed for a period of approximately 6 seconds and upon withdrawal were found to have a coating of 8 mils in thickness. The coated article was post-heated for from 5 to 10 minutes in an oven, the temperature which was maintained at about 475° F. It was found that the oxymethylene copolymer coating was firmly bonded to the primer, which in turn tightly adhered to the substrate used. Conventional tests such as cross-hatched Scotch tape, dart drop, and tensile pull test were used in an endeavor to remove the coating, and no failures were noted. In general, these coatings have proved to have excellent solvent resistance, high surface hardness and gloss, a low coefficient of friction, high heat resistance, uniform properties over a broad temperature range excellent mechanical properties, good corrosion resistance, and high static endurance.

EXAMPLE II

To illustrate the invention further, a length of Pyrex glass tubing of conventional diameter was degreased, followed by immersion in a polyvinyl formal solution of the concentration described in Example I. The coated part was maintained in an oven for 4 minutes, the oven temperature being held at approximately 475° F. A fluidized bed of the same general character noted in Example I was employed, and the heated part was immersed in the bed for approximately 5 seconds. The part was next postheated for approximately 5 minutes in an oven, the temperature of which was maintained at 475° F. The coated part was then quenched in room temperature water, and a tightly adherent coating of about 6 mils in thickness was obtained.

EXAMPLE III

A chrome plated steel part 100 mils in thickness and measuring 1 x 3 inches was degreased, and subjected to the procedure of Example II, except that the fluidized bed coated part was post-heated for 4 minutes. An excellent bond was obtained, and the polymeric coating had a thickness of about 9 mils.

EXAMPLE IV

Copper foils of about 80 mils in thickness were degreased, coated with the same polyvinyl formal solution, heated in an oven for approximately 1½ minutes, the oven temperature being about 475° F. Two dips of approximately 2 seconds each were given the part in the fluidized bed, and the coated part was post-heated for approximately 3 minutes at the same oven temperature of the preceding examples, and a tightly adherent polymeric coating of 9 to 10 mils was obtained.

EXAMPLE V

An aluminum pipe having a diameter of about 2 inches and a length of about approximately 3 inches was degreased, coated with the same solution of polyvinyl formal, was heated for 5 minutes in an oven maintained at 475° F., and was then dipped in the fluidized bed for about 9 seconds. The coated part was post-heated at 475° F. for 6 minutes, was quenched in room temperature water, and a firm bond of the polymer to the part was obtained, the polymeric coating being about 12 mils.

It is to be understood that the foregoing detailed description is given merely by way of illustration and that many variations may be made therein without departing from the novel concepts of this invention.

The embodiments of the invention in which an exclusive property or privilege is claimed are defined as follows:

1. A method of coating an article with an oxymethylene polymer coating, the article having a melting point above that of the polymer, which comprises,
    priming the article with a ½ to 5 percent polyvinyl acetal solution,
    heating the primed article to dry the primer and assure adherence of the primer to the article, and
    contacting the heated primed article with an oxymethylene polymer in particulate from so that the coating of the oxymethylene polymer will adhere to the article.

2. A coating method as defined in claim 1, in which the primer is selected from the group consisting of polyvinyl butyral and polyvinyl formal.

3. A coating method as defined in claim 1 wherein the oxymethylene polymer has a melting point above about 150° C. and wherein at least 60 percent of the recurring units are oxymethylene units, interspersed with —OR— groups in the main polymer chain, where R is a divalent radical containing at least two carbon atoms directly linked to each other and positioned in the polymer chain between the two valences, with any substituents on said R radical being inert.

4. A method of coating an article with an oxymethylene copolymer coating, the article having a melting point above that of the polymer, the copolymer having at least one chain containing recurring oxymethylene units interspersed with —OR— groups in the main polymer chain where R is a divalent radical containing at least two carbon atoms directly linked to each other and positioned in the chain between the two valences with any substituents on said R radical being inert, which comprises priming the article with about ½ to 5 percent solution of a primer material selected from the group consisting of polyvinyl butyral and polyvinyl formal, heating the primed article to dry the primer and assure adherence of the primer to the article, and immersing the article into a fluidized bed of the polymer particles so that the coating of the polymer will adhere to the article.

5. A method as defined in claim 4 wherein said polymer particles are between 40 mesh and 325 mesh.

6. A coated article, comprising an adherent layer thereon of a primer material selected from the group consisting of polyvinyl butyral and polyvinyl formal, and a coating of an oxymethylene polymer thereon.

References Cited

UNITED STATES PATENTS

| | | | |
|---|---|---|---|
| 2,775,570 | 12/1956 | Barkdoll et al. | 117—161 |
| 2,844,489 | 7/1958 | Gemmer | 117—21 X |
| 2,866,718 | 12/1958 | Guzetta | 117—21 X |
| 2,974,059 | 3/1961 | Gemmer | 117—21 X |
| 3,008,848 | 11/1961 | Annonio | 117—21 X |
| 3,016,875 | 1/1962 | Ballentine et al. | 117—21 X |
| 3,019,126 | 1/1962 | Bartholomew | 117—21 X |
| 3,027,352 | 3/1962 | Walling et al. | 260—67 |
| 3,106,769 | 10/1963 | Goethe et al. | 117—21 X |
| 3,122,525 | 2/1964 | Kern et al. | 260—67 |
| 3,136,651 | 6/1964 | Spessard | 117—21 X |
| 3,214,403 | 10/1965 | Peerman | 117—21 X |
| 3,264,131 | 8/1966 | Nagel | 117—21 X |

WILLIAM D. MARTIN, Primary Examiner

P. ATTAGUILE, Assistant Examiner

U.S. Cl. X.R.

117—18, 72, 75

PO-1050
(5/69)

UNITED STATES PATENT OFFICE
CERTIFICATE OF CORRECTION

Patent No. 3,481,756            Dated December 2, 1969

Inventor(s) Mr. Arthur Kong

It is certified that error appears in the above-identified patent and that said Letters Patent are hereby corrected as shown below:

Please correct the error on page 1, column 2 line 64 the number 1000 to 10,000.

SIGNED AND
SEALED
AUG 11 1970

(SEAL)
Attest:

Edward M. Fletcher, Jr.
Attesting Officer

WILLIAM E. SCHUYLER, JR.
Commissioner of Patents